Jan. 29, 1957  F. M. WILLIS  2,779,379
SELF-FASTENING TIRE CHAINS
Filed Dec. 3, 1954
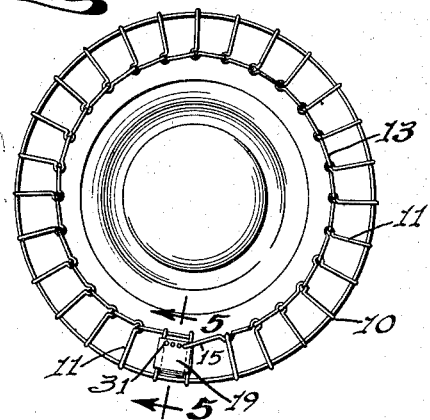
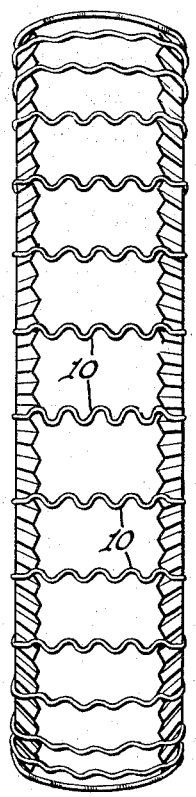
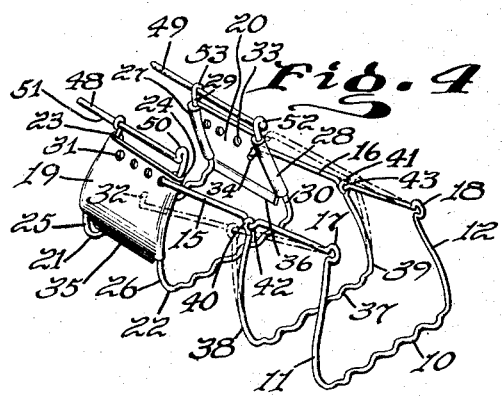
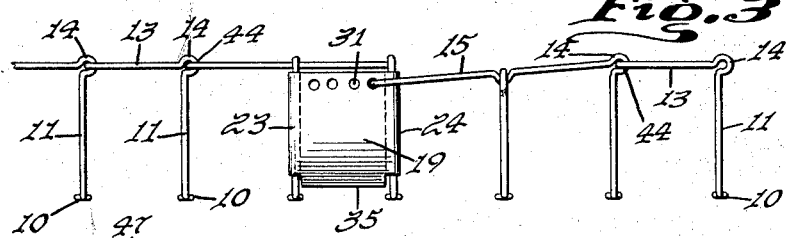
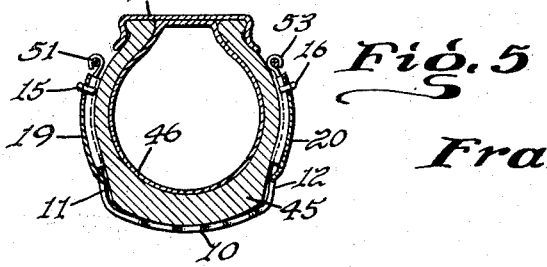
INVENTOR.
Frank M. Willis
BY Victor J. Evans & Co.
ATTORNEYS

United States Patent Office 2,779,379
Patented Jan. 29, 1957

2,779,379

SELF-FASTENING TIRE CHAINS

Frank M. Willis, Cottage Grove, Oreg.

Application December 3, 1954, Serial No. 472,830

3 Claims. (Cl. 152—225)

This invention relates to non-skid chains used on tires of motor vehicles, and in particular, a tire chain including spaced arches or loops with wavy sections positioned against the tread of the tire and with hooks extended from loops at one end and positioned to snap into openings in plates carried by loops at the opposite end of the chain and adapted to be positioned on opposite sides of a tire.

The purpose of this invention is to eliminate the necessity of soiling the hands and clothing by attempting to install tire chains on tires in mud, snow, ice and the like and to provide a tire chain which, when positioned with an end on which arcuate plates are positioned retained by spring inherent in loops thereof to a tire, the tire may be rolled over the remaining portion of the chain whereby hooks on the extended end are adapted to snap into openings in the arcuate plates positioned on the tire.

Various attempts have been made to hold one end of a tire chain on a tire by friction or other means whereby upon turning the wheel a chain is drawn around the tire, however, it is necessary to manually fasten the ends of the chain after the chain is positioned on the tire. In some instances, and particularly in rain and mud, it is difficult to fasten the chains without soiling the hands and clothing. With this thought in mind, this invention contemplates fastening elements on the ends of a tire chain whereby with the fastening elements at one end snapped over a tire the fastening elements at the opposite end will coact with the former fastening elements to secure the chain on the tire as the wheel is rolled over the chain with the chain positioned on the ground and extended from the wheel.

The object of this invention is, therefore, to provide an improved non-skid tire chain in which one end is adapted to snap into fastening elements on the opposite end with the chain wrapped around the tire.

Another object of the invention is to provide a non-skid tire chain that is adapted to snap on a tire as the tire is rolled over the chain in which the chain is adapted to be used on tires now in use.

A further object of the invention is to provide a non-skid tire chain having fastening means in ends thereof in which the chain is of a simple and economical construction.

With these and other objects and advantages in view, the invention embodies a tire chain comprising a plurality of substantially U-shaped loops with L-shaped ends freely connected with eyes and having hooks extended from one end and side plates with rows of openings positioned to receive the hooks therein mounted on a pair of loops at the opposite end.

Other features and advantages of the invention will appear from the following description taken in connection with the drawing, wherein:

Figure 1 is a side elevational view showing a wheel with the improved non-skid chain positioned thereon.

Figure 2 is an elevational view looking toward the tread of a tire mounted on a wheel showing the wavy tread portions of the loops of the chain extended across the tread and in which the parts are shown on an enlarged scale.

Figure 3 is a side elevational view illustrating the means for connecting the ends of the chain.

Figure 4 is a view similar to that shown in Figure 3 also illustrating the connecting elements, showing the parts in perspective and showing the hooks in the closing positions in broken lines.

Figure 5 is a cross section through the rim of a wheel with a tire thereon taken on line 5—5 of Figure 1 also illustrating the connecting elements at the ends of the chain.

Referring now to the drawing, wherein like reference characters denote corresponding parts, the improved tire chain of this invention includes spaced loops or U-shaped loops having wavy tread portions 10 with arms 11 and 12 at the sides and with bars 13 extended from eyes 14 at the ends of the arms, hooks 15 and 16 extended from eyes 17 and 18 of one of the loops and side plates 19 and 20 mounted on arms of loops 21 and 22 at the end of the chain opposite to that from which the hooks 15 and 16 extend.

The side plate 19 is provided with rolled ends 23 and 24 and, as shown in Figure 4, the roll 23 extends around an arm 25 of the loop 21 and roll 24 around an arm 26 of the loop 22. The ends of the plate 20 are provided with similar rolled ends 27 and 28, the rolled end 27 extending around an arm 29 of the loop 20 and the roll 28 being positioned around an arm 30 of the loop 22.

The plate 19 is provided with a row of spaced openings 31 that are adapted to receive a tip 32 of the hook 15 and the plate 20 is provided with a similar row of spaced openings 33 that are positioned to receive tip 34 of the hook 16.

The lower edge of the plate 19 is provided with an inwardly extended flange 35 and a similar flange 36 is provided on the lower edge of the plate 20.

With the parts positioned, particularly as illustrated in Figure 4, and with a chain stretched on the ground, the loops 21 and 22 are snapped over the tire with the chain extended from the tire and with the tire rolled along the chain the loops spring into position over the side walls thereof with the extension tips 32 and 34 of the hooks 15 and 16 engaging the flanges 35 and 36 of the plates 19 and 20 whereby the extension tips 32 and 34 slide upwardly against the outer surfaces of the plates, as indicated by the broken lines until the hooks reach the positions illustrated in full lines wherein the hooks snap into one of the openings 31 or 33 of the plates 19 and 20, respectively.

By this means, the latching elements of the chain are adapted to snap into locking positions as the tire rolls over the chain.

The hooks 15 and 16 are suspended by a pair of loops with a second loop, as indicated by the numeral 37, and having arms 38 and 39 positioned with eyes 40 and 41, at the upper ends of the arms, crimped-in offset portions 42 and 43 of the hooks.

With the parts formed and assembled as shown and described, horizontally disposed eyes 44 at the ends of the bars 13, extended from the eyes 14, of one loop are crimped in eyes 14 of an adjoining loop. By this means, the individual U-shaped loops are connected by bars 13 at the sides and the hooks 15 and 16 are carried by the last pair of loops at one end of the chain with the plates 19 and 20 carried by the last pair of loops at the opposite end of the chain.

As illustrated in Figure 5, the improved non-skid tire chain of this invention is shown on a motor vehicle tire 45 having an inner tube 46 and being mounted on a rim 47 and the side plates 19 and 20 are illustrated as being spaced from the walls of the tire by the rolls at ends thereof.

The arches or loops and also the outer surface of the tire may be formed in different designs and may be provided in different sizes.

It will also be understood that the hooks and plates may be mounted on the loops or arches by other suitable means, the hooks 15 and 16 being carried by two loops on one end of the chain and the plates 19 and 20 by the loops 21 and 22 on the opposite end, the loops 21 and 22 being connected by rods 48 and 49 to the eyes 14 of the next loop. As shown in Figure 4, the rod 48 extends from an eye 50 at the end of the arm 26 of the loop 22 and through an eye 51 at the end of the arm 25 of the loop 21; and the rod 49 extends from an eye 52 at the end of the arm 39 of the loop 22 and through an eye 53 at the end of the arm 29 of the loop 21.

It will be understood that other modifications, within the scope of the appended claims, may be made in the design and arrangement of the parts without departing from the spirit of the invention.

What is claimed is:

1. A non-skid device for motor vehicle tires comprising a chain including a plurality of U-shaped loops having wavy tread portions with arms extended from the ends and with eyes on extended ends of the arms, bars having eyes on extended ends thereof extended from eyes at the ends of the arms of some of the loops, the eyes on the extended ends of the bars being extended through the eyes on the extended ends of the arms of an adjoining loop, hooks extended from a loop at one end of the chain, and side plates having openings therein carried by loops at the end of the chain opposite to the end on which the hooks are positioned, said side plates being positioned whereby upon applying a chain to a tire the hooks extended from the first end of the chain are adapted to slide over the side plates and snap into the openings therein.

2. A non-skid device for motor vehicle tires comprising a chain including a plurality of U-shaped loops having wavy tread portions with arms extended from the ends and with eyes on extended ends of the arms, bars having eyes on extended ends thereof extended from the eyes at the ends of the arms, the eyes on the extended ends of the bars being extended through the eyes on the extended ends of the arms of an adjoining loop, hooks carried by a loop at one end of the chain and extended from said end, and side plates carried by a pair of loops at the opposite end of the chain, said side plates having spaced openings therein, and being positioned whereby upon applying a chain to a tire the hooks slide over the surfaces of the plates and snap into the openings therein.

3. A non-skid device for motor vehicle tires comprising a chain including hingedly connected U-shaped loops having wavy tread portions with arms extended from the ends and with eyes on extended ends of the arms, bars having eyes on extended ends thereof extended from eyes at the ends of the arms, the eyes on the extended ends of the bars being extended through the eyes on the extended ends of the arms of an adjoining loop, hooks carried by a loop at one end of the chain and extended from said end, and side plates carried by a pair of loops at the opposite end of the chain, said side plates having arcuate inwardly extended flanges on edges thereof and openings therein and being positioned whereby upon applying a chain to a tire the hooks slide over the surfaces of the plates and snap into the openings therein.

References Cited in the file of this patent

UNITED STATES PATENTS

| 1,397,182 | Rollins | Nov. 15, 1921 |
| 1,571,764 | Edwards | Dec. 2, 1926 |
| 2,696,237 | Doughty | Dec. 7, 1954 |

FOREIGN PATENTS

| 335,903 | France | Dec. 21, 1903 |